Aug. 17, 1943.                A. I. LORIG                 2,326,787
                          DETACHABLE BIFOCALS
                          Filed Aug. 21, 1940
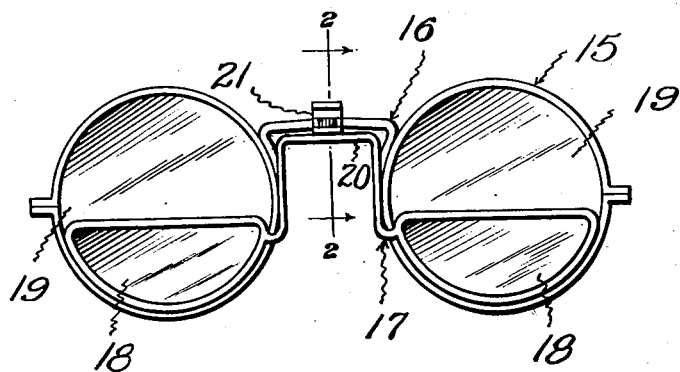
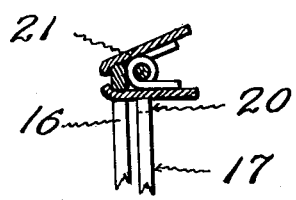
Inventor
ALVIN I. LORIG
By
        Attorney Patented Aug. 17, 1943

2,326,787

UNITED STATES PATENT OFFICE 2,326,787

DETACHABLE BIFOCALS

Alvin I. Lorig, Washington, D. C.

Application August 21, 1940, Serial No. 353,567

3 Claims. (Cl. 88—41)

This invention relates to a supplementary lens mounting for eye-glasses, and has for one of its objects the production of a simple and efficient means for connecting supplementary lenses upon the front face of a pair of eye-glasses in a manner whereby the eye-glasses may be utilized as bi-focals.

A further object of this invention is the production of a simple and efficient means for supporting and connecting the supplementary lenses to the front face of the eye-glasses frame and lenses supported thereby.

Other objects and advantages of the present invention will appear throughout the following specification and claims.

In the drawing:

Figure 1 is a front elevational view of a pair of eye-glasses showing the supplementary lenses carrying frame supported upon the pair of eye-glasses; and Figure 2 is a vertical sectional view taken on line 2—2 of Figure 1.

By referring to the drawing it will be seen that 15 designates the frame of the eye-glasses having the usual bridge portion 16. In carrying out my invention, I preferably provide a supplementary frame 17 carrying supplementary lenses 18 at the lower end thereof and in a position to extend across the bottom portion of the lenses 19 carried by the eye-glasses frame 15. The supplementary frame 17 is provided with an inverted U-shaped portion 20 which carries a spring-pressed jaw clamp 21, in the nature of a pinch clamp, the outer ends of the clamp 21 being adapted to grip the bridge portion 16 and firmly lock the supplementary frame 17 in a hung position, or in a suspended position from the bridge portion 16. The biting engagement of the spring jaw clamp 21 with the bridge portion 16 of the eye-glasses frame 15 firmly and rigidly holds the supplementary frame 17 in position without the necessity of employing other securing means, thereby holding the lenses 18 in proper relation with respect to the lenses 19 so that the lenses 18 may perform the function, so to speak, of removable bifocal lenses. The clamp 21 constitutes the sole supporting and connecting means between the eye-glasses frame 15 and the supplementary frame 17 and provides means whereby the supplementary frame may be readily attached to a conventional pair of glasses and readily removed therefrom merely by pinching the pinch clamp between the fingers of one hand of the operator. This enables a person to attach and detach the supplementary frame with a minimum amount of effort.

It should be understood that the supplementary lenses 18 may be of colored glass if desired, to constitute a shade or sun glass without departing from the spirit of the invention.

Certain detail changes in the construction may be employed without departing from the spirit of the invention so long as such changes fall within the scope of the appended claims.

Having described the invention, what I claim as new is:

1. In combination with a pair of eye-glasses having a bridge portion and lenses, a supplementary frame, a pinch clamp carried by the supplementary frame for securely engaging said bridge portion, and rigidly holding the supplementary frame in engagement with said bridge portion and against swinging movement with respect to the bridge portion and lenses, the clamp constituting the sole supporting and connecting means between the pair of eye-glasses and the supplementary frame, and supplementary lenses carried by the supplementary frame and adapted to be supported in front of the lenses of the eye-glasses.

2. As an article of manufacture, a supplementary frame carrying supplementary lenses adapted to fit over a pair of eye-glasses, and a pinch clamp carried by the supplementary frame adapted to grip the bridge portion of a pair of eye-glasses and constituting the sole supporting and connecting means between the supplementary frame and the eye-glasses to which the supplementary frame is adapted to be attached for rigidly holding the supplementary frame and supplementary lenses in proper relative position for providing proper vision through the lenses.

3. As an article of manufacture, a supplementary frame carrying supplementary lenses adapted to fit over a pair of eye-glasses, and a spring-pressed pinch clamp carried by the supplementary frame adapted to grip the bridge portion of a pair of eye-glasses for rigidly holding the supplementary frame and supplementary lenses in proper relative position for providing proper vision through the lenses and constituting the sole supporting means for the supplementary frame.

ALVIN I. LORIG.